Oct. 6, 1953     I. A. KERNKAMP     2,654,493
OXYGEN TANK TRUCK
Filed Sept. 22, 1950     2 Sheets—Sheet 1
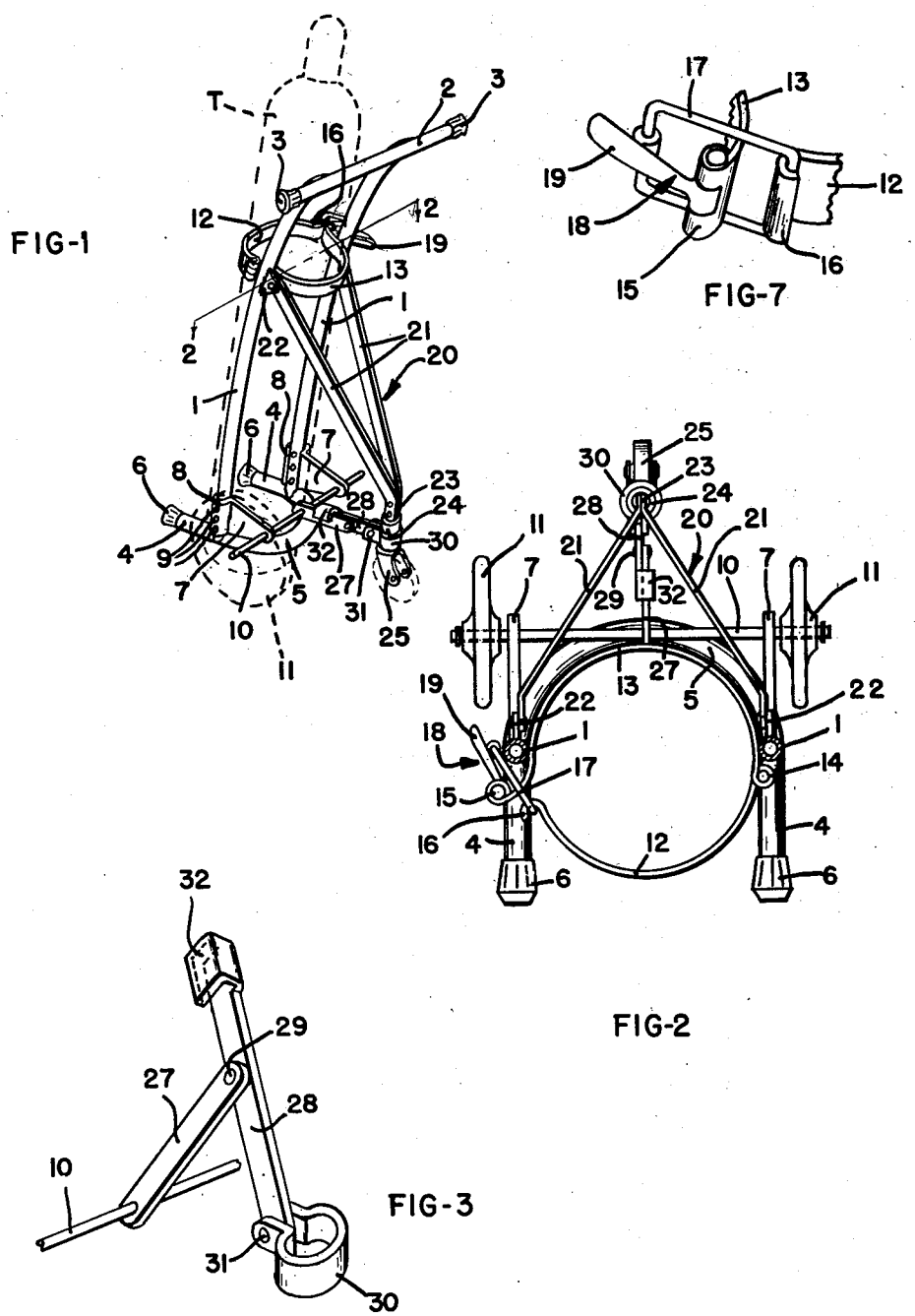
Inventor
Irwin A. Kernkamp
By Glenn L. Fish
Attorney Oct. 6, 1953      I. A. KERNKAMP      2,654,493
OXYGEN TANK TRUCK
Filed Sept. 22, 1950      2 Sheets-Sheet 2
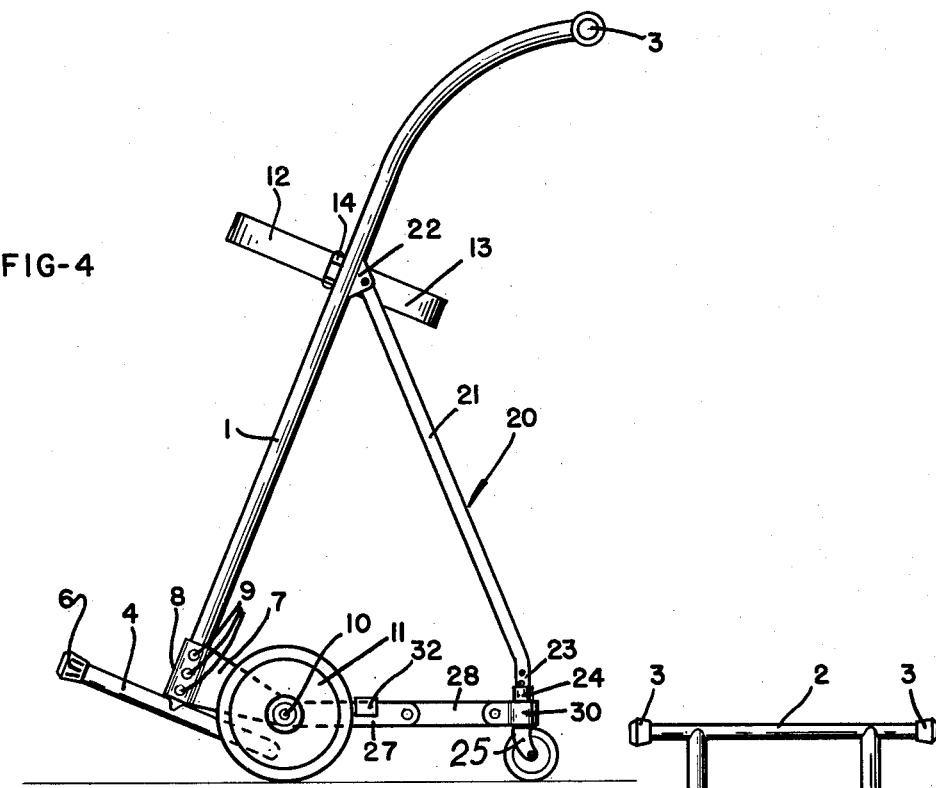
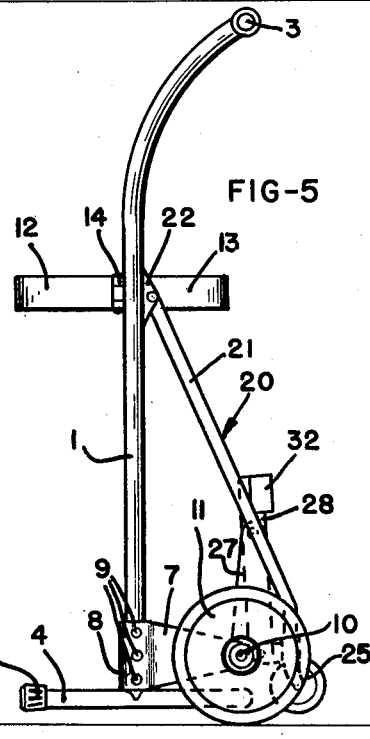
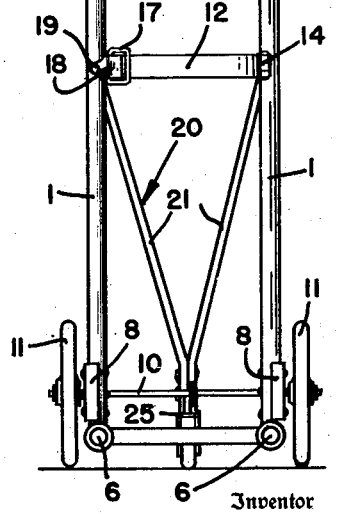
Inventor
Irwin A. Kernkamp
Glenn L. Fish
Attorney Patented Oct. 6, 1953

2,654,493

UNITED STATES PATENT OFFICE 2,654,493

OXYGEN TANK TRUCK

Irwin A. Kernkamp, Spokane, Wash.

Application September 22, 1950, Serial No. 186,180

1 Claim. (Cl. 214—374)

This invention relates to an oxygen tank truck and it is one object of the invention to provide a truck which in some respects resembles a trundle truck and may be used for supporting an oxygen tank in a substantially upright position and transporting the tank from one place to another.

Another object of the invention is to so form the truck that it may be thrust forwardly into position for straddling engagement with an oxygen tank and the tank then secured so that by tipping the truck rearwardly the tank will be lifted from a floor and the entire truck and tank supported upon wheels and the truck pushed from one place to another.

Another object of the invention is to provide the truck with a prop carrying a castor at its lower end which rests upon the floor so that the truck may be held upright and easily moved forwardly to a position for straddling engagement with a tank to be lifted and transported.

Another object of the invention is to provide an improved brace for the prop, the brace being so constructed that while the prop will be firmly held in position for use the brace may be readily moved to a folded position and the castor at the lower end of the prop raised to a position out of contact with the floor.

Another object of the invention is to provide a truck which may be formed of metal strips and thus be of light weight while very strong and capable of supporting a heavy oxygen tank.

The invention is illustrated in the accompanying drawings wherein:

Fig. 1 is a perspective view of the improved oxygen tank truck.

Fig. 2 is a view upon an enlarged scale taken transversely through the truck along the line 2—2 of Figure 1.

Fig. 3 is a perspective view of a brace for the rear strut of the truck.

Fig. 4 is a side elevation of the truck showing the strut in an extended position for use.

Fig. 5 is a view similar to Fig. 4 showing the strut folded.

Fig. 6 is a front view of the truck.

Fig. 7 is a perspective view of the latch for the moveable jaw of the tank encircling clamp.

This improved truck is particularly serviceable for transporting heavy oxygen tanks from one place to another in a hospital or doctor's office but it will be understood that it may be used for lifting and transporting acetylene gas tanks, fuel tanks holding compressed gas, or other heavy objects such as pipes, cylinders of pumps or engines, or the like.

The frame of the truck in some respects resembles a trundle truck used for transporting trunks, ash cans, and other heavy objects and has side bars 1 which are formed of metal tubes. These side bars have their upper portions curved rearwardly and at their upper ends welded to a cross bar or handle bar 2 which is also formed of a metal tube and has its end portions projecting outwardly from the side bars. Bumpers 3 formed as rubber caps are fitted upon ends of the handle and serve to shield ends of the handle and prevent damage to walls in case the handle strikes a wall while the truck is in use. At their lower ends the side bars are welded to the arms 4 of a U-shaped yoke 5 which is disposed horizontally with its arms projecting forwardly beyond the side bars. Rubber caps or bumpers 6 fit tightly upon front ends of the arms 4 and prevent damage to a wall.

Brackets 7, which are formed of sheet metal, project rearwardly from lower end portions of the side bars and at their front ends are formed with laterally extending hooks 8 which straddle the side bars and are secured thereto by rivets 9. An axle 10 is mounted through the brackets transversely of the frame and this axle carries wheels 11 which allow the truck to be readily shifted forwardly or rearwardly when in an upright position and also allow the truck to be easily moved along a floor while transporting a heavy oxygen tank from one place to another.

After the truck has been thrust forwardly in an upright position and its yoke disposed in straddling relation to a tank T, indicated by dotted lines in Figure 1, the tanks must be firmly secured to the truck. In order to do so there has been provided a clamp consisting of front and rear jaws 12 and 13. These jaws are formed from metal strips, and upon referring to Figure 2 it will be seen that the rear jaw is welded to the side bars 1 and has its end portions projecting forwardly therefrom and terminating in loops for sleeves 14 and 15. The front jaw 12 is pivoted at one end to the loop 14 and at its free end is formed with a bail or hook 16 for engagement by the loop 17 of a latch 18. The loop 17 is pivotally carried by a handle 19 which is pivoted to the loop 15 and since the jaws are formed of resilient metal the front jaw may be drawn into tight gripping engagement with the tank when the lever or handle is swung rearwardly to the securing position. It will thus be seen that after the yoke 5 has been disposed in straddling engagement with the tank the clamp may be secured about the tank and the frame then tilted rearwardly to an inclined position in which the tank is lifted from the floor and its lower portion supported upon the yoke which serves as a saddle and its upper portion supported upon the rear jaw of the clamp.

In order to support the truck at an incline while moving it about there has been provided a prop 20. This prop has side bars 21 formed from metal strips which have their upper ends pivoted to ears 22 carried by the side bars 1 of the frame. The side bars or strips 21 extend downwardly in converging relation to each other and at their lower ends are bent to form ears 23 which are secured in a socket 24 in which is mounted a castor 25 which rests upon the floor and thus causes the truck to be held at an incline to transport the tank T with its lower end raised above the floor and completely supported by the truck.

A break-joint brace extends between the axle 10 and the lower end of the prop 20. This brace has front and rear sections 27 and 28, and upon referring to Figure 3 it will be seen that the front section 27 has one end pivotally carried by the axle and its other end pivoted to the rear section by a pivot pin as rivet 29. A collar 30 to which the rear end of the section 28 is pivoted by a pin 31 fits tightly about the socket 24 so that the brace may have pivotal movement relative to the socket. The rear section projects forwardly beyond the pivotally mounted end of the front section and at its front end is formed with a laterally offset hook 32 which limits downward movement of the two sections beyond a horizontal position. Therefore the brace will serve to hold the prop in an extended position in which the castor 25 rests upon the floor. When it is desired to store the tank and truck temporarily without removing the truck, the brace may be broken upwardly and allow the prop to be folded to dispose it out of the way.

After the yoke or saddle is in straddling engagement with the tank and the front jaw 12 of the clamp secured across the tank, the truck is tilted rearwardly to lift the tank from the floor and comes to rest upon the castor 25 for transportation of the tank from one place to another.

Having thus described the invention, what is claimed is:

A truck for an oxygen tank comprising a frame having vertical side bars, a handle bar mounted across upper ends thereof, a tank receiving saddle secured to lower ends of the side bars, a clamp carried by said side bars and extending between the side bars in position adapting it to be secured about an upper portion of the tank, brackets having laterally extending hooks at their front ends secured about lower ends of said side bars with the brackets projecting rearwardly from the side bars, a horizontal axle mounted through rear ends of said brackets and extending transversely of the frame with end portions projecting laterally from the brackets, wheels carried by the end portions of said axle and disposed at opposite sides of the frame, ears secured to the side bars in upwardly spaced relation to said brackets and extending rearwardly from the side bars, a prop having arms pivoted at their upper ends to said ears and converging downwardly with relation to each other and secured together at their lower ends, a socket mounted on the lower ends of said converging arms, a castor mounted in and extending downwardly from said socket, a collar secured about said socket, and a break-joint brace pivotally secured at its rear end to said collar and at its front end being pivotally secured to said axle.

IRWIN A. KERNKAMP.

References Cited in the file of this patent

UNITED STATES PATENTS

| Number | Name | Date |
|---|---|---|
| 909,297 | Helgeson | Jan. 12, 1909 |
| 1,358,881 | Sabin | Nov. 16, 1920 |
| 1,637,640 | Hendricks | Aug. 2, 1927 |
| 1,795,812 | Whiting | Mar. 10, 1931 |
| 1,896,249 | Russel | Feb. 7, 1933 |
| 2,249,123 | Fleck et al. | July 15, 1941 |
| 2,477,294 | Fuller | July 26, 1949 |

FOREIGN PATENTS

| Number | Country | Date |
|---|---|---|
| 620,893 | Great Britain | Mar. 31, 1949 |
| 965,067 | France | Feb. 8, 1950 |